US007805302B2

(12) United States Patent
Chelba et al.

(10) Patent No.: US 7,805,302 B2
(45) Date of Patent: Sep. 28, 2010

(54) APPLYING A STRUCTURED LANGUAGE MODEL TO INFORMATION EXTRACTION

(75) Inventors: Ciprian Chelba, Seattle, WA (US); Milind Mahajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1471 days.

(21) Appl. No.: 10/151,979

(22) Filed: May 20, 2002

(65) Prior Publication Data

US 2003/0216905 A1 Nov. 20, 2003

(51) Int. Cl.
*G10L 15/00* (2006.01)
*G10L 15/18* (2006.01)
*G06F 17/27* (2006.01)

(52) U.S. Cl. ............................ 704/257; 704/9; 704/255

(58) Field of Classification Search .................... 704/1, 704/9, 10, 257, 255; 715/503–504, 507; 707/3–4
See application file for complete search history.

(56) References Cited

U.S. PATENT DOCUMENTS

| 4,914,590 | A | * | 4/1990 | Loatman et al. ................. 704/8 |
| 5,068,789 | A | * | 11/1991 | van Vliembergen ............. 704/9 |
| 5,651,096 | A | * | 7/1997 | Pallakoff et al. ............. 704/275 |
| 5,685,000 | A | * | 11/1997 | Cox, Jr. ........................ 704/9 |
| 5,689,617 | A | * | 11/1997 | Pallakoff et al. ............. 704/255 |
| 5,752,052 | A | * | 5/1998 | Richardson et al. ............. 704/9 |
| 5,797,123 | A | * | 8/1998 | Chou et al. ............... 704/256.5 |
| 6,081,774 | A | * | 6/2000 | de Hita et al. ................... 704/9 |
| 6,163,785 | A | * | 12/2000 | Carbonell et al. ............... 704/9 |
| 6,314,399 | B1 | * | 11/2001 | Deligne et al. ............... 704/257 |
| 6,631,346 | B1 | * | 10/2003 | Karaorman et al. ............. 704/9 |
| 6,636,831 | B1 | * | 10/2003 | Profit et al. ................... 704/275 |
| 6,714,939 | B2 | * | 3/2004 | Saldanha et al. ................ 704/9 |
| 6,745,161 | B1 | * | 6/2004 | Arnold et al. ................... 704/9 |
| 6,829,603 | B1 | * | 12/2004 | Chai et al. ...................... 704/9 |
| 7,020,607 | B2 | * | 3/2006 | Adachi ........................ 704/257 |
| 7,027,974 | B1 | * | 4/2006 | Busch et al. .................... 704/4 |

OTHER PUBLICATIONS

K. Wang, "Natural Language Enabled Web Applications," in Proc. First NLP and XML Workshop, Tokyo, Japan, Nov. 2001.*
Pellom et al, "University of Colorado Dialog Systems for Travel and Navigation," presented at the Human Language Technology Conf. San Diego, CA, 2001, pp. 1-6.*
Miller et al. "A Fully Statistical Approach to Natural Language Interfaces." In Proceedings of the 34th Annual Meeting of the Association for Computational Linguistics, 1996, pp. 55-61.*

(Continued)

*Primary Examiner*—James S Wozniak
(74) *Attorney, Agent, or Firm*—Joseph R. Kelly; Westman, Champlin & Kelly, P.A.

(57) ABSTRACT

One feature of the present invention uses the parsing capabilities of a structured language model in the information extraction process. During training, the structured language model is first initialized with syntactically annotated training data. The model is then trained by generating parses on semantically annotated training data enforcing annotated constituent boundaries. The syntactic labels in the parse trees generated by the parser are then replaced with joint syntactic and semantic labels. The model is then trained by generating parses on the semantically annotated training data enforcing the semantic tags or labels found in the training data. The trained model can then be used to extract information from test data using the parses generated by the model.

6 Claims, 12 Drawing Sheets

OTHER PUBLICATIONS

Ciprian Chelba and Frederick Jelinek. "Structured Language Modeling for Speech Recognition." In Proceedings of NLDB99, 1999.*

Chelba et al, "Information Extraction Using the Structured Language Model," EMNLP, Pittsburgh, 2001.*

Wu et al, "Syntactic heads in statistical language modeling", Proceedings of the IEEE Conference on Acoustics Speech and Signal Processing, 2000, pp. 1699-1702.*

Chelba, "Exploiting Syntactic Structure for NaturalLanguage Modeling", PhD-thesis, Johns Hopkins University, Maryland, 2000.*

Ciprian Chelba, "Portability of Syntactic Structure for Language Modeling. Microsoft Speech Net", Aug. 20, 2001.

Matthew Aylett, "Stochastic Suprasegmentals: Relationship between Rudundancy, Prosodic Structure and Syllabic Duration" HCRC and Dept. Lingustics, University of Edinburgh. 1999.

Ye-Yi Wang, A Robust Parser for Spoken Language Understanding. Microsoft Research Group.

X. Huang et al., "MIPAD: A Next Generation PDA Prototype". Microsoft Speech Technology Group.

A.P. Dempster et al., Maximum Likelihood from Incomplete Data via the EM Algorithm. Harvard University 1976.

Adam L. Berger et al., "A Maximum Entropy Approach to Natural Language Processing". IBM T.J. Watson. 1996.

* cited by examiner

APPLYING A STRUCTURED LANGUAGE MODEL TO INFORMATION EXTRACTION

BACKGROUND OF THE INVENTION

The present invention relates to machine understanding of textual or speech inputs. More specifically, the present invention relates to the task of information extraction in the machine understanding process.

Natural language user interfaces to computers attempt to allow the user to operate a computer simply by inputting commands or directions to the computer in a natural language. Natural language user interfaces can make computers easier to use. Such interfaces (such as spoken language interfaces) are sometimes one of the only interfaces practicable as opposed to other traditional methods of input, such as keyboards and mice. For example, the spoken language interface may be the only practicable interface in scenarios such as hands busy applications or eyes busy applications (when the user is driving for example), for people with disabilities or where the size of the device needs to be very small in order to be usable (such as cell phones and personal digital assistants-PDAs). In natural language interfaces, the user speaks or otherwise interacts with the computer (which can be a PDA, a desktop computer, a telephone, etc.) and asks the computer to carryout certain actions. In order to operate properly, the computer must understand the intentions that the user has expressed. The process of attempting to understand what the user has expressed is commonly referred to as natural language understanding (NLU) or, if the input modality being used by the user is speech, the process is referred to as spoken language understanding (SLU).

An important step in the understanding process involves extracting fragments of information from the utterance (or textual input) and associating these fragments with the concepts in the task which the user is attempting to have the computer perform. This step in the process is commonly referred to as information extraction.

Take as an example a user input sentence (where the user says or types or handwrites) "Schedule a meeting with John Smith on Saturday". An information extraction process will hopefully identify the task requested by the user as that of dealing with meetings (as opposed to emails, for example). The information extraction process will also desirably associate the phrase "John Smith" with the concept of "meeting attendee" and the word "Saturday" with the concept of "meeting day".

Current approaches used for information extraction require handwritten grammars, usually context free grammars (CFGs). Development of a CFG requires domain expertise, and expertise in grammar authoring. It is an iterative and time consuming process that requires grammars to be written using a combination of knowledge and data, and then tested and refined using test data. Thus, the current approaches can tend to be not only time consuming, but quite costly.

SUMMARY OF THE INVENTION

Information extraction from text can be characterized as a template filling process. In other words, a given template or frame contains a certain number of slots that need to be filled in with segments of text. The label of the frame corresponds to a high level of understanding, such as the particular action being requested by the user. The slots are to be filled in with attributes that refine this top level understanding.

Typically, not all the words in text are relevant to a particular frame. Assuming that the segments of text relevant to filling in the slots are non-overlapping, contiguous strings of words, one can represent the semantic frame as a simple semantic parse tree for the sentence to be processed. The tree has two levels: the root node is tagged with the frame label and spans the entire sentence, while the leaf nodes are tagged with the slot labels and span the strings of words (or constituents) relevant to the corresponding slots.

One feature of the present invention uses the parsing capabilities of a structured language model in the information extraction process. During training, the structured language model is first initialized with syntactically annotated training data. The model is then trained by generating parses on semantically annotated training data enforcing annotated constituent boundaries. The syntactic labels in the parse trees generated by the parser are then replaced with joint syntactic and semantic labels. The model is then trained by generating parses on the semantically annotated training data enforcing the semantic tags (or labels) as well as the annotated constituent boundaries found in the training data.

In one embodiment, the structured language model operates with binary trees in a left-to-right, bottom-up fashion. This ensures that relevant semantic information will be properly labeled during training.

During run-time or test-time, the present system can provide as its output, either the top rated frame, based on probabilities generated by the structured language model, or the system can sum the probability of a frame over all the parses that have the same semantic annotation and output the highest scoring frame. In addition, the system can access the schema associated with the application program. During run time, the system can discard parsed hypotheses (as they are being generated) if they are found to violate the structure imposed by the schema.

Also, since the structured language model is actually a language model, it can be implemented as the language model portion of a speech recognition system. Therefore, the novel concepts of the present invention can easily be practiced regardless of whether the input is actually text, or speech.

DETAILED DESCRIPTION OF ILLUSTRATIVE EMBODIMENTS

The present invention is an information extraction system that utilizes a structured language model. The system can be implemented on a computing device and as a method.

Figure 1:
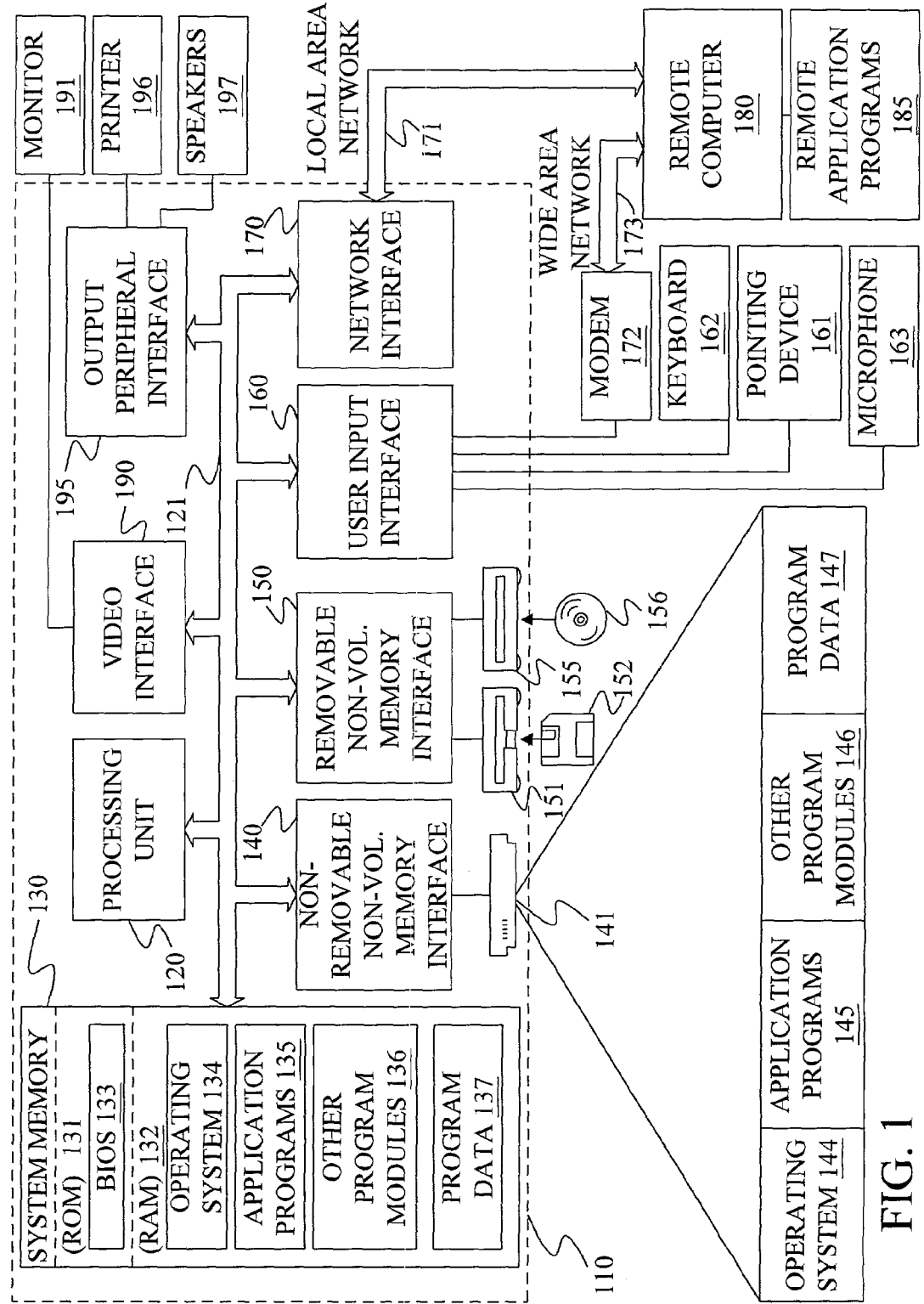
FIG. 1 is a block diagram of one embodiment of a computer environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

In application programs which are intended to interact with the user (such as personal information management programs, flight reservation or other travel programs, banking programs, etc.) it is common for semantic information in such applications to be defined in a semantic schema. Semantic schema is often used for many different purposes. For example, semantic schema serves as the specification for a language-enabled application. In other words, once a semantic schema is defined, grammar and application logic development can proceed simultaneously according to the semantic schema. Semantic schema can also play a crucial role in dialog management. Further, the semantic schema is language independent, in the sense that it does not specify the linguistic expressions used to express a concept. Therefore, it is used not only for language-enabling applications, but also for integrating inputs from multi-modalities, such as mouse click events. Thus, in many applications, the semantic schema must be authored and already exists prior to the implementation of an information extraction component.

The semantic schema for an application will thus contain a set of templates, or frames, that define an action to be taken by the computer. The frames or templates have one or more slots that are to be filled in from the input text in order to prompt the action to be performed.

Figure 2:
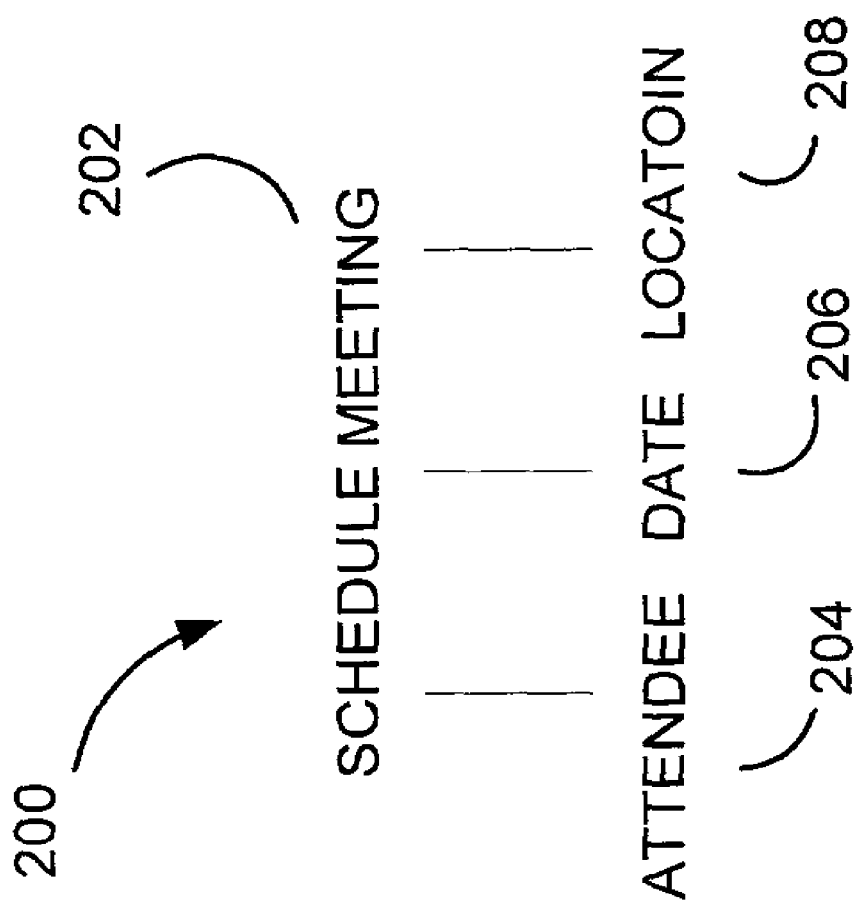
FIG. 2 illustrates one simplified embodiment of a template or frame that may be found in an application schema.

As a simplistic example, FIG. 2 illustrates a template or frame 200 in accordance with one example. Frame 200 defines an action "schedule meeting" and that is the label 202 of frame 200. Frame 200 also includes a plurality of slots. The slots correspond to attributes that further define the action to be taken. In the embodiment shown in FIG. 2, the slots for frame 200 include an "attendee" slot 204, a "date" slot 206 and a "location" slot 208.

The job of the information extraction component is to identify frame 202, and fill in the appropriate slots from a natural language user input such as the input sentence "Schedule a meeting with John Smith on Saturday."

In accordance with one embodiment of the present invention, frames 200 for applications correspond to a two-level structure such as that shown in FIG. 2. Thus, the problem of information extraction can be viewed as the recovery of a two-level semantic parse for a given word sequence. In accordance with one embodiment of the present invention, a data driven approach to information extraction uses a structured language model (SLM). An overview of the SLM will now be given.

The structured language model is set out in greater detail in Ciprian Chelba and Frederick Jelinek, *Structured Language Modeling*, Computer Speech and Language, 14(4):283-332, October 2000; and Chelba, *Exploiting Syntactic Structure for Natural Language Modeling*, Ph.D. Dissertation, Johns Hopkins University, 2000. Briefly, however, the structured language model builds syntactic parses and uses them to predict the next word in the sentence.

For example, assume that an input sentence is the same as discussed above "Schedule a meeting with John Smith on Saturday." Assume also that the last recognized word is "Smith" such that the next word to be recognized will be "on". A traditional language model (such as a tri-gram language model) attempts to predict a next word by calculating the probability of that word given its history (in a tri-gram language model, given the previous two words) Thus, it can be seen that the conventional tri-gram language model will be attempting to predict the word "on" given the two previous words "John Smith". By contrast, a structured language model (SLM) first builds a parse of the known part of the input sentence and attempts to predict the next word given the syntactic parse.

Figure 3:
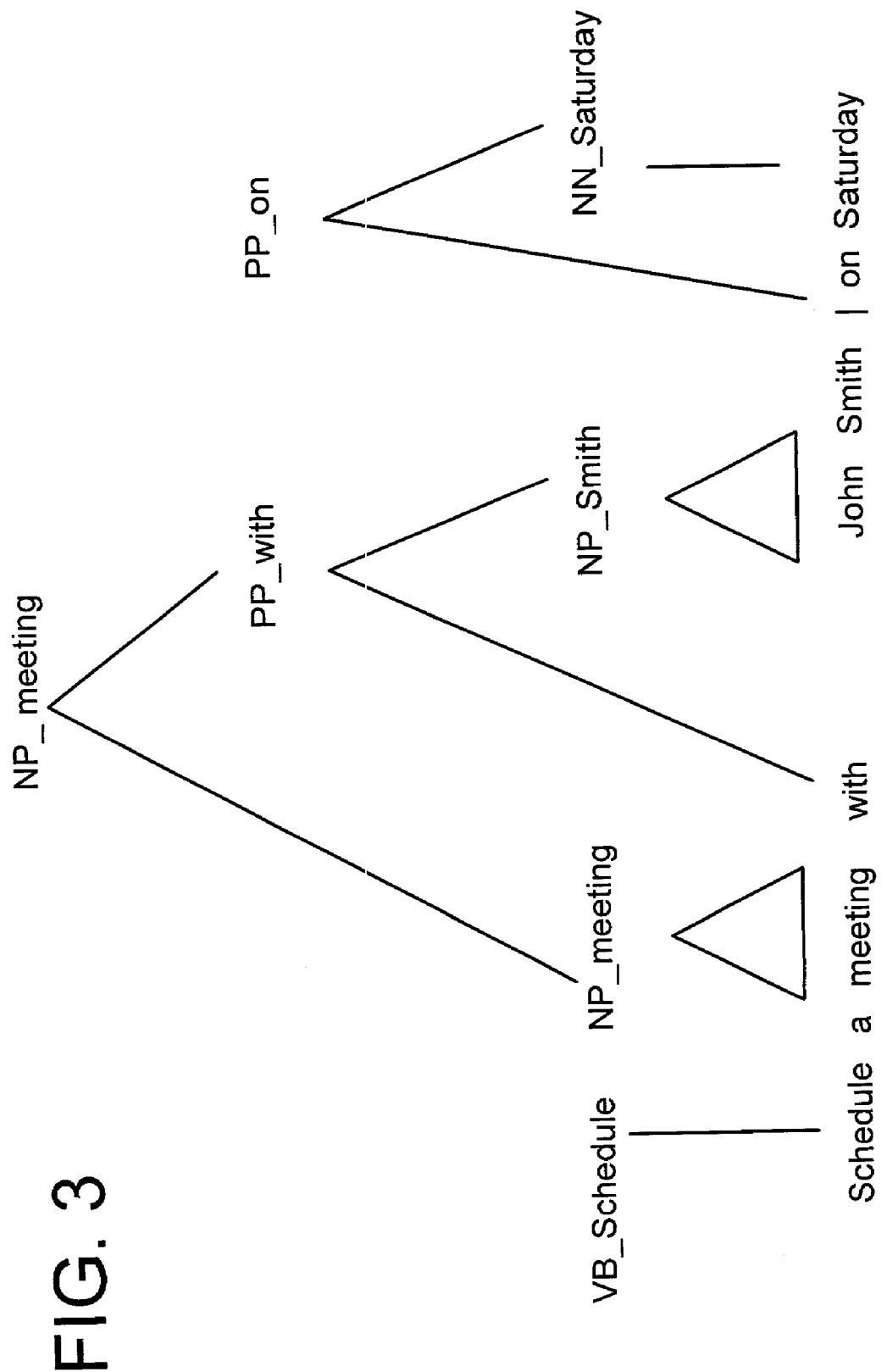
FIG. 3 illustrates a parse generated by a structured language model.

FIG. 3 is one illustrative syntactic parse of the example input sentence. The vertical line in the input sentence illustrates the place at which processing is to commence. The SLM percolates a headword up to each node in the syntactic parse, wherein the headword is a word that most closely defines that constituent of the sentence. By using the headwords as the historical context for the next word, the SLM predicts the next word. It can be seen from FIG. 3 that the headwords that immediately precede the word "on" are "schedule meeting". Thus, it can be appreciated that the probability of seeing the word "on" after the words "schedule meeting" is much greater than the probability of seeing the word "on" after the words "John Smith". The present invention takes advantage of the parsing feature found in the structured language model.

Figure 4:
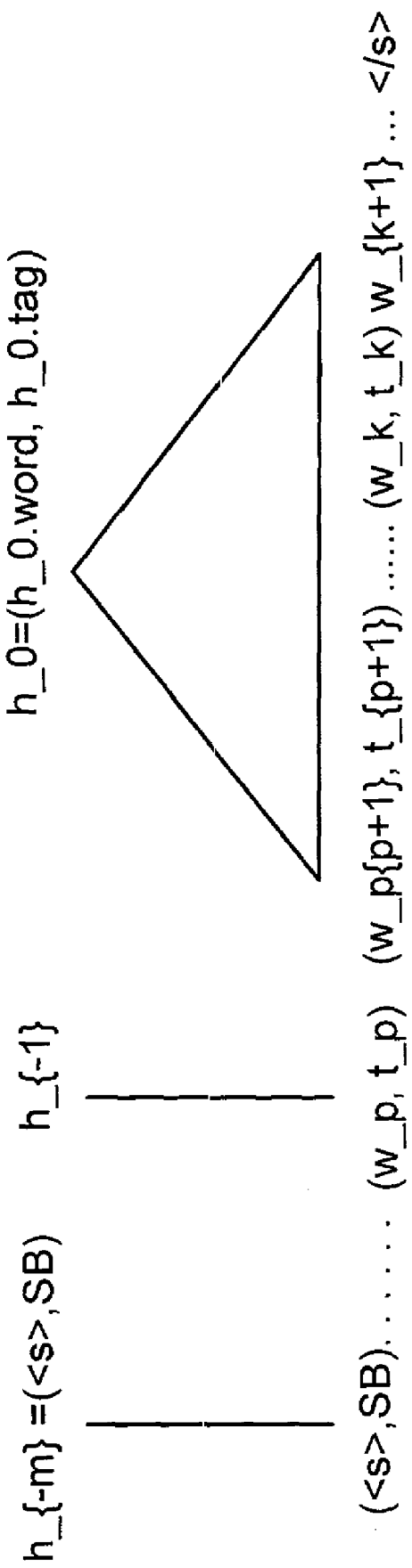
FIG. 4 illustrates a word-parse k-prefix.

The SLM is now described in a bit greater detail for the sake of completeness. The model assigns a probability $P(W, T)$ to every sentence W and its every possible binary parse T. The terminals of T are the words of W with part of speech tags (POStags), and the nodes of T are annotated with phrase headwords and non-terminal labels. Assume W is a sentence of length n words to which has been prepended the sentence beginning marker <s> and appended the sentence end marker </s> so that $w_0$=<s> and $w_{n+1}$=</s>. Let $W_k=W_0 \ldots W_k$ be the word k-prefix of the sentence—the words from the beginning of the sentence up to the current position k—and $W_k T_k$ the word-parse k-prefix. FIG. 4 shows a word-parse k-prefix; h_0...h_{-m} are the exposed heads, each head being a pair (head-word, non-terminal label), or (word, POStag) in the case of a root-only tree. The exposed heads at a given position k in the input sentence are a function of the word-parse k-prefix.

Figure 5:
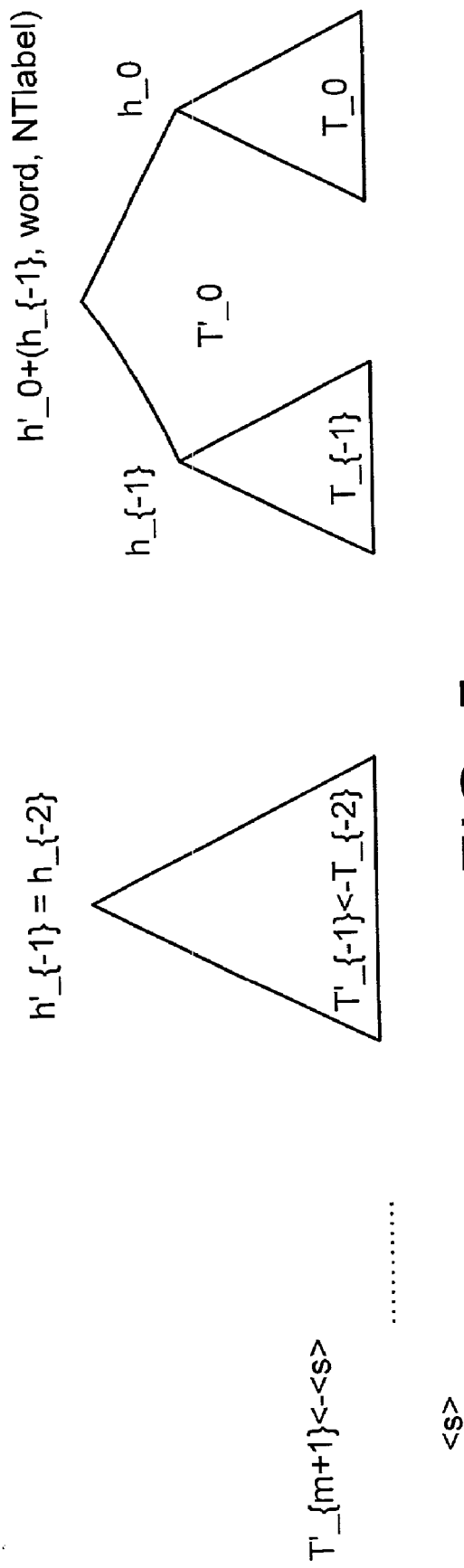
FIG. 5 shows the result of an adjoin-left operation during parsing.
Figure 6:
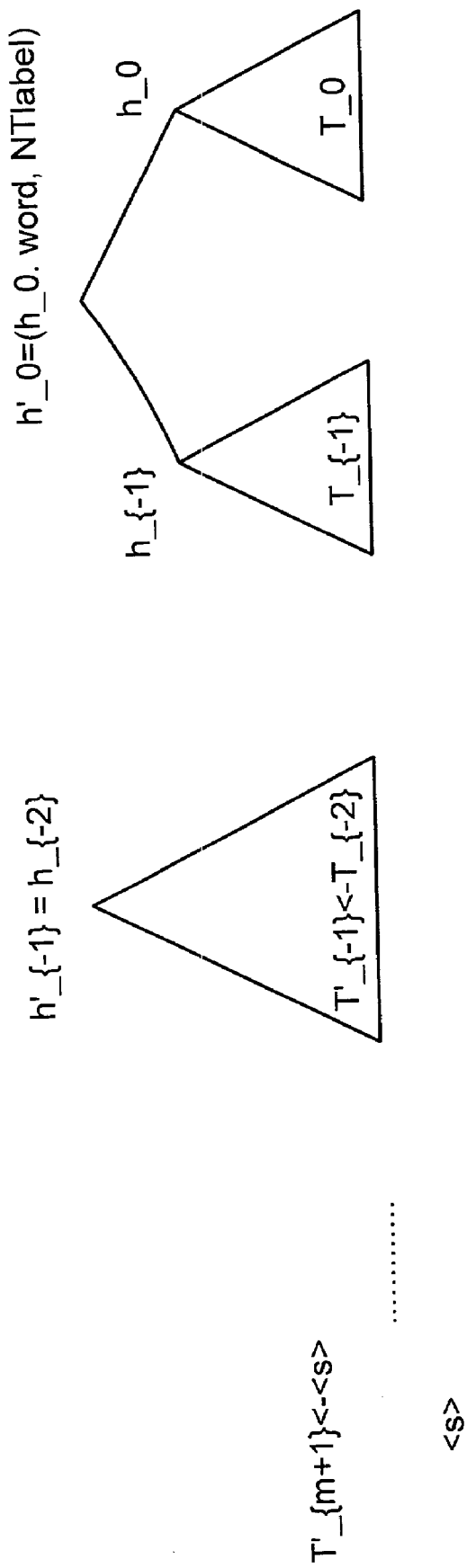
FIG. 6 shows the result of an adjoin-right operation during parsing.

The joint probability P(W,T) of a word sequence W and a complete parse T can be broken into:

$$P(W,T) = \prod_{k=1}^{n+1} [P(w_k / W_{k-1} T_{k-1}) \cdot P(t_k / W_{k-1} T_{k-1}, w_k) \cdot \prod_{i=1}^{N_k} P(p_i^k / W_{k-1} T_{k-1}, w_k, t_k, p_1^k \ldots p_{i-1}^k)]$$

where:
$W_{k-1} T_{k-1}$ is the word-parse (k–1)-prefix;
$W_k$ is the word predicted by a word-predictor component;
$t_k$ is the tag assigned to wk by a POS tagger component;
$N_k$-1 is the number of operations the parser executes at sentence position k before passing control to the word-predictor (the $N_k$-th operation at position k is the null transition) $N_k$ is a function of T;
$P_i^k$ denotes the i-th parser operation carried out at position k in the word string; the operations performed by the parser are illustrated in FIGS. 5-6. FIG. 5 shows the result of an adjoin-left operation and FIG. 6 shows the result of an adjoin-right operation. These operations ensure that all possible binary branching parses with all possible head-word and non-terminal label assignments for the $w_1 \ldots w_k$ word sequence can be generated. The $$p_1^k \ldots p_{N_k}^k$$

sequence of parser operations at position k grows the word-parse (k–1) prefix into a word-parse k-prefix.

The model is based on three probabilities, each illustratively estimated using deleted interpolation and parameterized (approximated) as follows:

$$P(w_k / W_{k-1} T_{k-1}) \doteq P(w_k / h_0, h_{-1})$$
$$P(t_k / w_k, W_{k-1} T_{k-1}) \doteq P(t_k / w_k, h_0, h_{-1})$$
$$P(p_i^k / W_k T_k) \doteq P(p_i^k / h_0, h_{-1})$$

It is worth noting that if the binary branching structure developed by the parser were always right-branching and the POStag and non-terminal label vocabularies were mapped to a single type then the model would be equivalent to a trigram language model. Also, since the number of parses for a given word prefix $W_k$ grows exponentially with k, $|\{T_k\}| \sim O(2^k)$, the state space of the model is huge even for relatively short sentences so a search strategy is illustratively used that prunes it. One embodiment uses a synchronous multi-stack search algorithm which is very similar to a beam search.

The language model probability assignment for the word at position k+1 in the input sentence is made using:

$$P(w_{k+1} / W_k) = \sum_{T_k \in S_k} P(w_{k+1} / W_k T_k) \cdot \rho(W_k T_k), \quad (1)$$

$$\rho(W_k T_k) = P(W_k T_k) / \sum_{T_k \in S_k} P(W_k T_k)$$

which ensures a proper probability over strings W, where $S_k$ is the set of all parses present in our stacks at the current stage k.

Each model component—word-predictor, tagger, parser—is initialized from a set of parsed sentences after undergoing headword percolation and binarization. Separately for each model component the system illustratively gathers counts from "main" data—which may be about 90% of the training data; and estimates the interpolation coefficients on counts gathered from "check" data—which may be the remaining 10% of the training data.

An N-best variant of the EM algorithm (Dempster et al., *Maximum Likelihood From Incomplete Data Via the EM Algorithm*, Journal of the Royal Statistical Society, Volume 39 of B, pp 1-38 (1977)) is employed to jointly re-estimate the model parameters such that the likelihood of the training data under the model is increased.

As mentioned above, the problem of information extraction can be viewed as the recovery of a two-level semantic parse for a given word sequence. In accordance with one embodiment of the present invention, a data driven approach to information extraction uses a SLM.

Figure 7A:
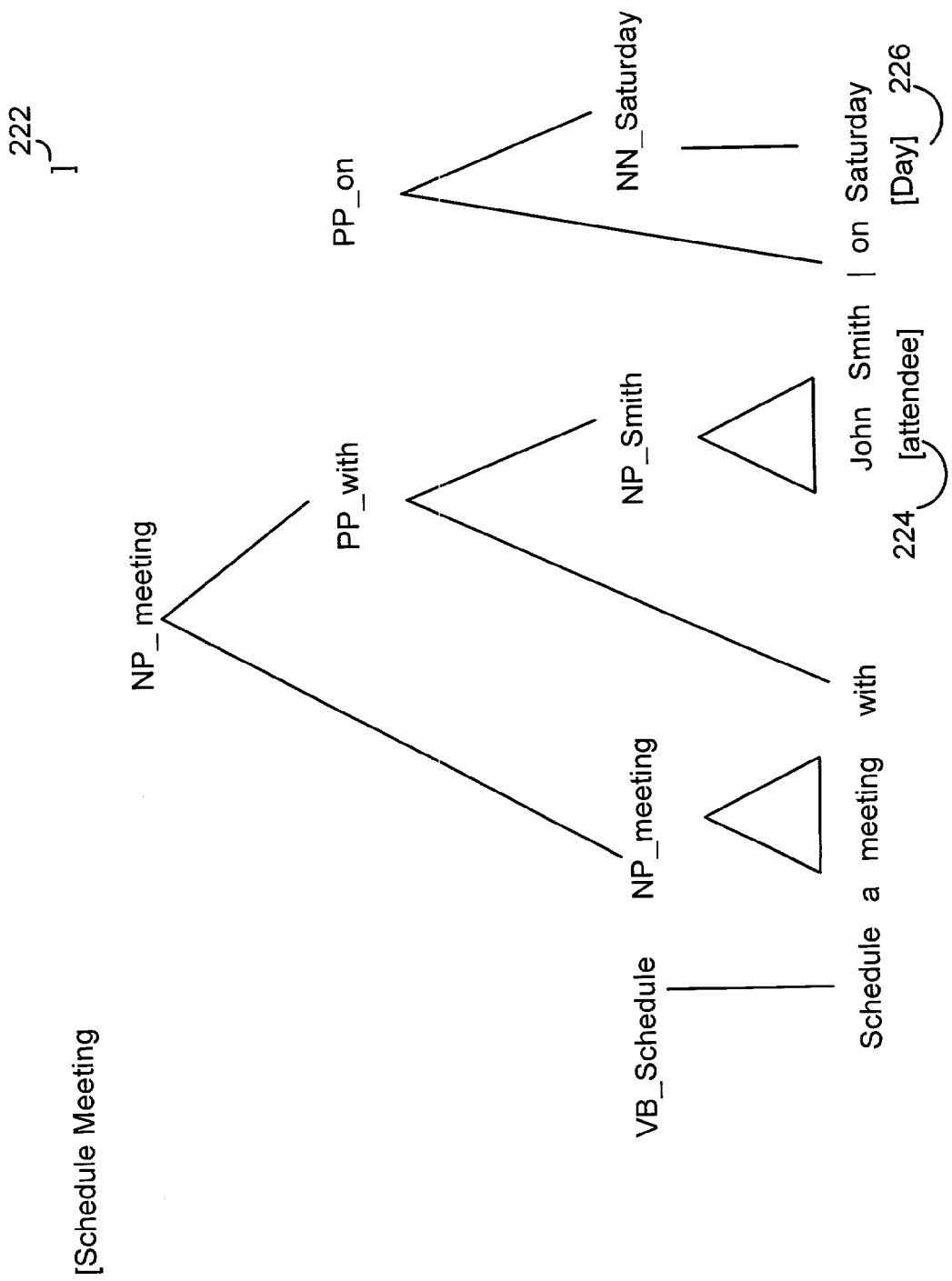
FIG. 7A illustrates one embodiment of a sentence found in the annotated training data.
Figure 8:
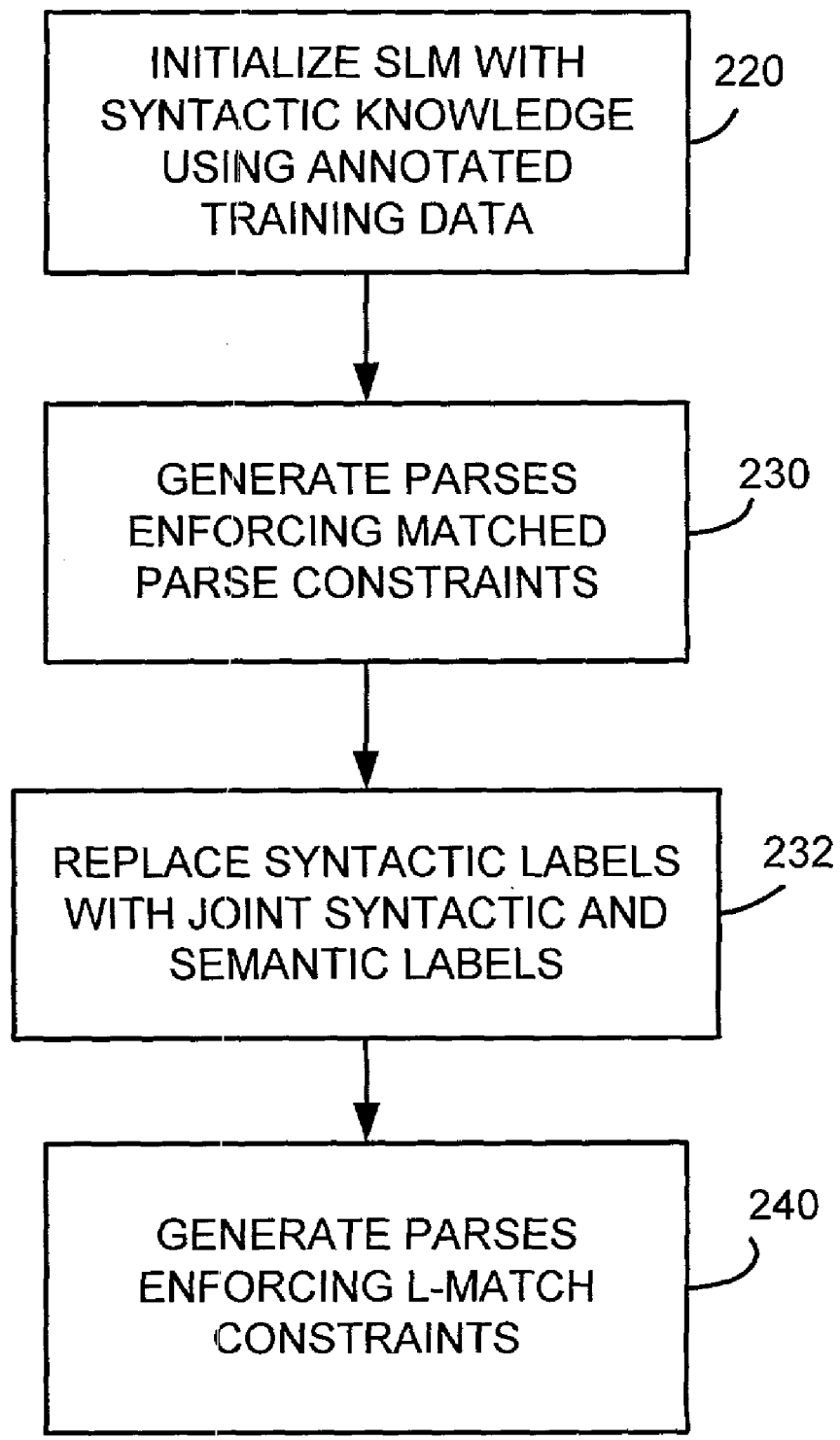
FIG. 8 is a flow diagram illustrating one embodiment of the process of training a structured language model in accordance with the present invention.

The model training procedure for training an SLM for information extraction will now be discussed. FIG. 7A illustrates one example sentence of annotated training data that can be used to train the system, and FIG. 8 is a flow diagram illustrating the training procedure. In order to train the system, the SLM is first initialized with syntactic knowledge using annotated training data. This is indicated by block 220 in FIG. 8. One example of annotated training data is that shown in FIG. 7A which contains the example sentence "Schedule a meeting with John Smith on Saturday." for which a parse tree has been built (as shown in FIG. 3) and for which a frame label 222 and slot labels 224 and 226 have been added by annotation.

As discussed with respect to frame 200 above, frame label 222 indicates the overall action being referred to by the input sentence. In the present example shown in FIG. 7A, frame label 222 identifies the "schedule meeting" action. Semantic slot labels 224 and 226 correspond to slots for the frame. Slot label 224 is the "attendee" slot and, as annotated, corresponds to the input word sequence (or constituent) "John Smith". Slot 226 is the "day" or "date" slot and, as annotated, corresponds to the word sequence (or constituent) "Saturday" in the input sentence.

In order to initialize the SLM, all that is needed is the syntactic portion of the annotated training data. In that case, a general purpose parser can be used to generate a syntactic tree bank from which the SLM parameters can be initialized. Alternatively, the SLM can be initialized using a tree bank for out-of-domain data (such as the UPenn Tree bank described in greater detail in Markus,

*Building A Large Annotated Corpus of English: The Penn Tree Bank*, Computational Linguistics, 19(2):313-330 (1993)).

The next step in training is to train the model by constraining parses generated during the training to enforce the annotated constituent boundaries. This is indicated by block 230 in FIG. 8. The constituent boundaries for the "attendee" semantic label 224 are the words "John" and "Smith". Therefore, during the training step 230, any parses generated by the SLM which do not combine "John" and "Smith" together as a single constituent will not be considered.

This step is referred to as training the SLM as a "match constrained parser." Specifically, the parser proposes a set of n syntactic binary parses for a given word string, all matching the constituent boundaries specified by the semantic parse. A parse T is said to match the semantic parse S denoted T∋S, if and only if the set of unlabeled constituents that define S is included in the set of constituents that define T. It can thus be seen that, at this step, only the constituent span information in the semantic parse S is taken into account.

Figure 7B:
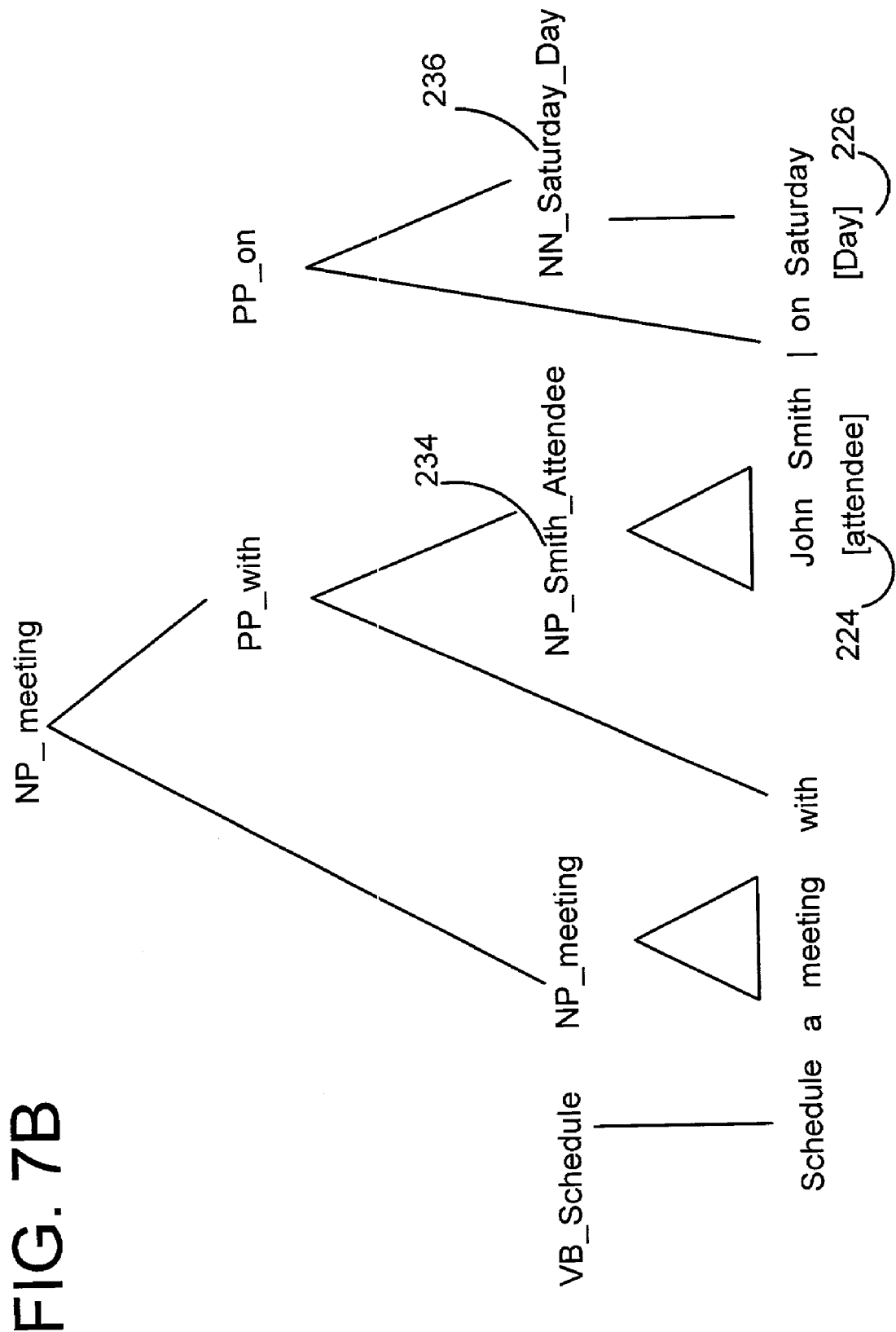
FIG. 7B illustrates joint syntactic and semantic labels.

Next, the syntactic labels in the syntactic parse are replaced with joint syntactic and semantic labels. This is indicated by block 232 in FIG. 8. An example of this step is illustrated in FIG. 7B. Since only three of the syntactic nodes in the parse tree of FIG. 7A have been annotated with semantic labels, those labels are added to the syntactic labels to make a joint syntactic and semantic label. The first such label is indicated by numeral 234 and is the NP_Smith_attendee label. The second is illustrated by numeral 236 and is the NN_Saturday_day label. The third is illustrated by numeral 238 and is the S_schedule_ScheduleMeeting label.

This step thus enriches the non-terminal and pre-terminal labels of the resulting parses with the semantic tags (both frame and slot) present in the semantic parse. This thus expands the vocabulary of the non-terminal and pre-terminal tags used by the syntactic parser to include semantic information along with the usual syntactic tags.

Finally, the SLM is trained again using constrained parsing. This time, however, the constraint is not only to match the constituent spans or boundaries, but it is also constrained to match the annotated semantic labels and is thus referred to as enforcing the L-match (for label-match) constraint. This is indicated by block 240 in FIG. 8.

During this process, the SLM is allowed to explore (or generate parses for) only the semantic parses found in the training data. Thus, the semantic constituent labels are taken into account. This means that a parse P —containing both syntactic and semantic information —is said to L-match S if and only if the set of labeled semantic constituents that defines S is identical to the set of semantic constituents that defines P. If we set Sem(P) to denote the function that maps a tree P containing both syntactic and semantic information to the tree containing only semantic information, referred to as the semantic projection of P, then all the parses $P_i$, $\forall i<N$ proposed by the SLM for a given sentence W, L-match S and thus satisfy $SEM(P_i)=S$, $\forall i<N$.

In the present embodiment, the semantic tree S has a two-level structure. Therefore, the above requirement can be satisfied only if the parses Sem(P) proposed by the SLM have also two-levels (frame and slot levels, respectively).

The two constrained parsing steps illustrated by blocks 230 and 240 in FIG. 8 ensure that the constituents proposed by the SLM do not cross semantic constituent boundaries and that the labels proposed are the desired ones. The constraints C to be used in constrained parsing in steps 230 and 240 can be defined as a span of the sentence, together with a set of allowable tags for the span;

C=[l,r,Q]

where l is the left boundary of the constraint, r is the right boundary of the constraint and Q is the set of allowable non-terminal (semantic) tags for the constraint.

The trees produced by the SLM are binary trees. The tags annotating the nodes of the tree are purely syntactic during the training step 230 and are syntactic and semantic during the training step 240. Thus, by satisfying the two following conditions at each position k in the input sentence, it is ensured that all the binary trees generated by the SLM parsing algorithm match the pre-set constraints $C_i$, i=1 . . . C as it proceeds from left to right through the input sentence $W=W_0 \ldots W_{n+1}$:

1. For a given word-parse k-prefix $W_k T_k$ accept an adjoin transition if an only if:
   a. the resulting constituent does not violate any of the constraints $c_i$, I=1 . . . C
   b. L-match parsing only: if the semantic projection of the non-terminal tag SEM(NTtag) proposed by the adjoin operation is non-void then the newly created constituent must L-match an existing constraint, ∃ c s. t. SEM(NTtag) ∈ $c_i$.Q.
2. For a given word-parse k-prefix $W_k T_k$ accept the null transition if and only if all the constraints $c_i$ whose right boundary is equal to the current word index k, $c_i \cdot r = k$, have been matched. If these constraints remain un-matched they will be broken at a later time during the process of completing the parse for the current sentence W: there will be an adjoin operation involving a constituent to the right of the current position that will break all the constraints ending at the current position k.

Figure 9:
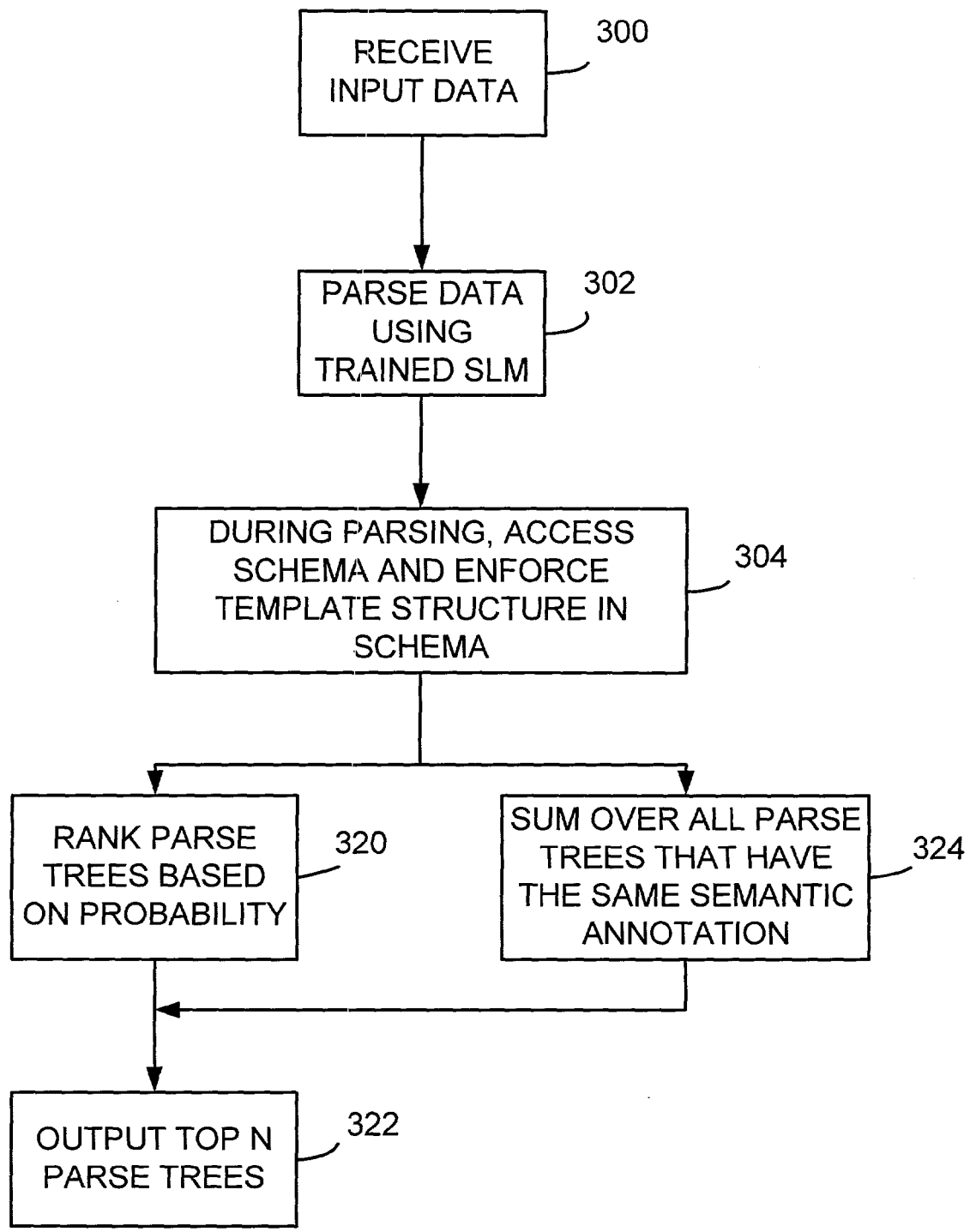
FIG. 9 is a flow diagram illustrating one embodiment of the operation of the structured language model during run-time, or test-time, in accordance with one embodiment of the present invention.
Figure 10:
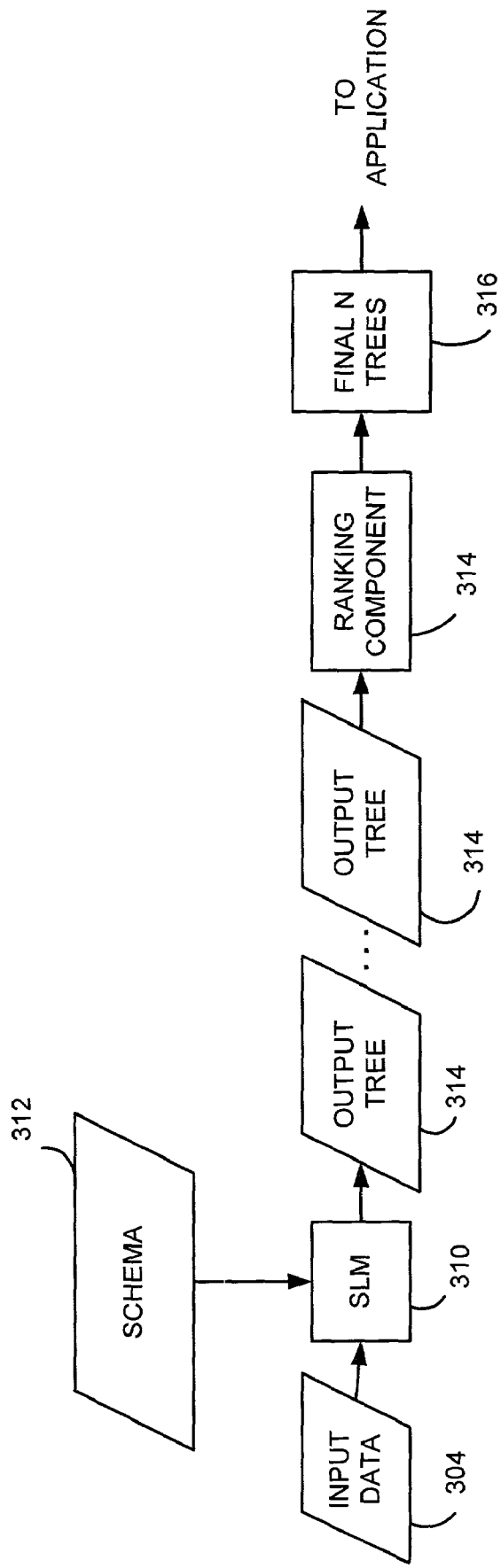
FIG. 10 is a data flow diagram also illustrating the operation of the present system during run-time or test-time, in accordance with one embodiment of the present invention.

FIG. 9 illustrates the operation of the SLM parser during test or run time. FIG. 10 is a data flow diagram illustrating a SLM 310 and a ranking component 316. FIGS. 9 and 10 will be described in conjunction with one another. First, during run time, SLM 310 receives input data 300, such as an input sentence to be parsed. This is indicated by block 300 in FIG. 9.

Next, the trained SLM 310 parses the input data as indicated by block 302. During parsing, SLM 310 accesses the semantic application schema 312. In doing so, SLM 310 enforces the template structure in schema 312 during the parsing operation.

For example, in accordance with one embodiment of the present invention, the application schema has frames or templates which are exactly two levels. The frame (or root) level and the slot (or leaf) level. During parsing, SLM 310 discards any hypothesis parses which violate this structure. This is indicated by block 304. When parsing is complete, SLM 310 will illustratively have parsed a desired number of parse trees 314.

The parse trees 314 are then ranked by ranking component 316. Of course, it should be noted that ranking component 316 can be integrally formed with SLM component 310, or it can be a separate component. In ranking parse trees 314, ranking component 316 can rank in a number of different ways. For example, ranking component 316 can simply output N semantic parses 318 corresponding to the parse trees ranked highest according to the probabilities computed by SLM 310. When N=1, this can be expressed mathematically as, $S=SEM(argmax_{P_i} P(P_i, W))$. This is indicated by blocks 320 and 322 in FIG. 9. Also, however, ranking component 316 can sum the probability of a semantic parse over all of the parses P that yield the same semantic parse S, and then choose the top N semantic parses with the highest associated probabilities. When N=1, this can be expressed mathematically as $S = argmax_s$ $$\sum P_i s \cdot t \cdot SEM(P_i) = {}_S P(P_i, W).$$

This is indicated by block 324 in FIG. 9.

Figure 11:
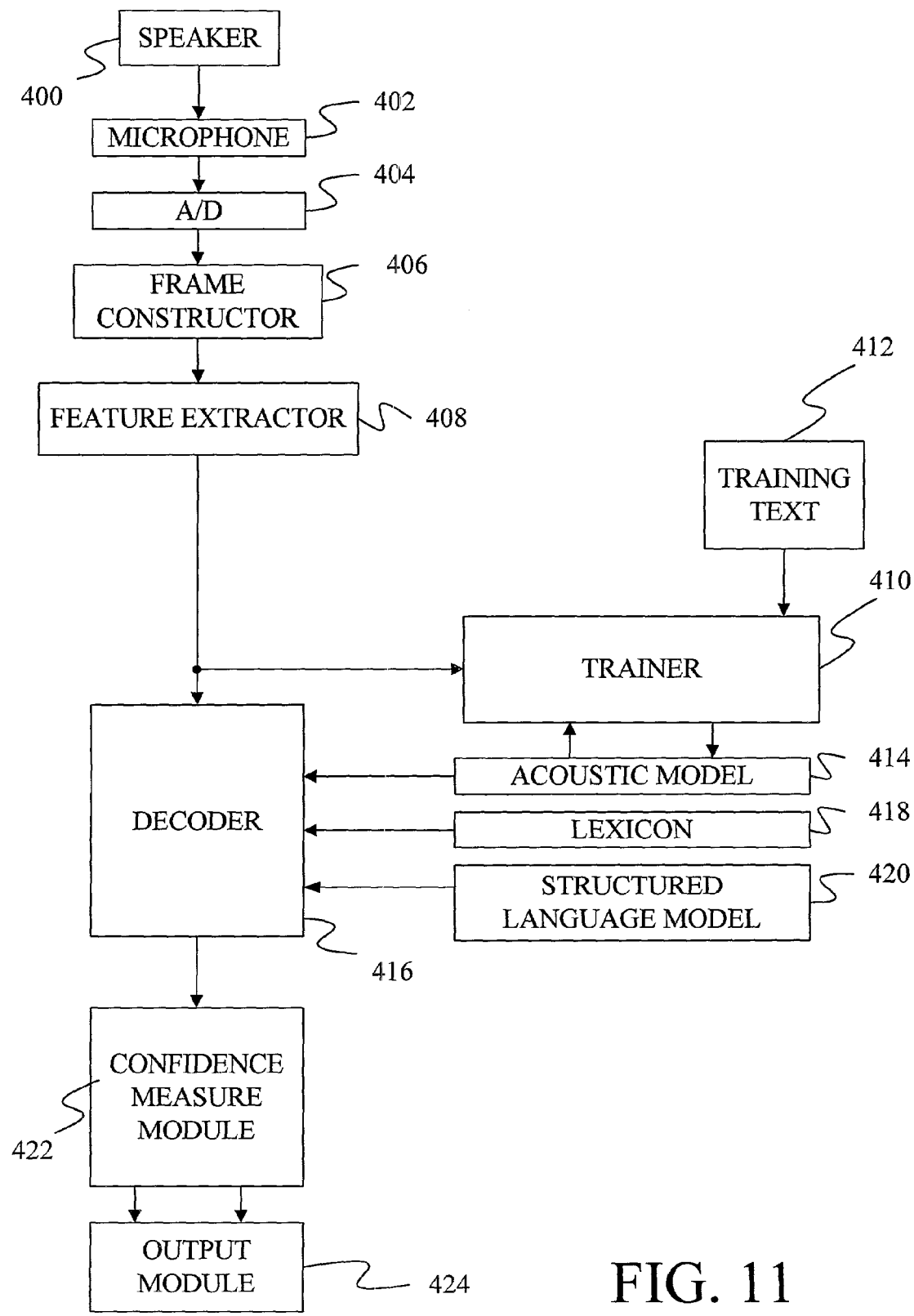
FIG. 11 is a block diagram of a speech recognition system employing a structured language model in accordance with one embodiment of the present invention.

One additional advantage of the present invention is that the SLM is not simply a parser, but is actually a language model that can be used in a speech recognition system. FIG. 11 shows a speech recognition system in which one or more of the information extraction techniques of the present invention can be used to extract information (frame and slots) from a natural language speech input signal.

In FIG. 11, a speaker 400, either a trainer or a user, speaks into a microphone 402. The audio signals detected by microphone 402 are converted into electrical signals that are provided to analog-to-digital converter 404.

A-to-D converter 404 converts the analog signal from microphone 402 into a series of digital values. In several embodiments, A-to-D converter 406 samples the analog signal at 16 kHz and 16 bits per sample, thereby creating 32 kilobytes of speech data per second. These digital values are provided to a frame constructor 406, which, in one embodiment, groups the values into 25 millisecond frames that start 10 milliseconds apart. These "frames" are not the same as the frames or templates used in information extraction, but are just portions of the digitized speech signal.

The frames of data created by frame constructor 406 are provided to feature extractor 408, which extracts a feature from each frame. The feature extraction module 408 produces a stream of feature vectors that are each associated with a frame of the speech signal.

If the input signal is a training signal, this series of feature vectors is provided to a trainer 410, which uses the feature vectors and a training text 412 to train an acoustic model 414. Techniques for training such models are known in the art and a description of them is not required for an understanding of the present invention.

If the input signal is a test signal, the feature vectors are provided to a decoder 416, which identifies a most likely sequence of words based on the stream of feature vectors, a lexicon 418, a structured language model 420, and the acoustic model 414. The particular method used for decoding is not important to the present invention and any of several known methods for decoding may be used.

The most probable sequence of hypothesis words is illustratively provided to a confidence measure module 422. Confidence measure module 422 can identify which words are most likely to have been improperly identified by the speech recognizer, based in part on a secondary acoustic model (not shown). Confidence measure module 422 then provides the sequence of hypothesis words to an output module 424 along with identifiers indicating which words may have been improperly identified. Those skilled in the art will recognize that confidence measure module 422 is not necessary for the practice of the present invention.

In the system illustrated in FIG. 11, it will be appreciated that structured language model 420 can perform its speech recognition language model duties in order to recognize the speech input by speaker 400 and then perform feature extraction parsing on the recognized speech, as discussed above. Alternatively, since structured language model 420 is generating parses during the speech recognition task, it can use that information to perform information extraction. Thus, SLM 400 can be used in this embodiment not only to assist in the recognition of speech, but also to perform information extraction from speech.

It can thus be seen that the present invention employs a structured language model in information extraction. In one embodiment, the structured language model is trained using constrained parsing. The constraints that are enforced can relate to the constituent boundaries and the semantic tags for the constituents.

In another embodiment, the SLM operates in a left-to-right, bottom-up fashion and generates binary trees. This enhances the ability to enrich the syntactic tags with semantic tags. During test or run time, one embodiment of the present invention constrains the parser with the semantic schema such that the parser only considers parses having structures which do not violate the structures in the semantic schema. In addition, the output of one embodiment of the present invention is a desired number of semantic parse trees which are summed over all parse trees that have the same semantic annotation. Similarly, the present invention can be used as a part of a speech recognition system so that the information can be extracted directly from speech.

Although the present invention has been described with reference to particular embodiments, workers skilled in the art will recognize that changes may be made in form and detail without departing from the spirit and scope of the invention.

What is claimed is:

1. A method of extracting information from a natural language input using a computer having a processor and memory, comprising:

accessing a semantic schema with a structured language model, the semantic schema having a template with a structure of frames that corresponds to one or more pieces of information to be extracted for an application program;

generating, with the processor, a candidate parse by parsing the natural language input with the structured language model, wherein, during generation, the structured language model generates hypothesis parses of a portion of the natural language input by applying the template and accepts only those hypothesis parses, as possible candidate parses, if the hypothesis parses completely match the structure of frames from the template, and discards all hypothesis parses, during construction of the hypothesis parses, that do not completely match the structure of frames from the templates, each accepted candidate parse including syntactic head words, and semantic labels, and using the head words and semantic labels in each accepted candidate parse to predict a next word in the natural language input, to obtain an overall parse for the natural language input, the overall parse having a semantic frame label and one or more constituents of the natural language input each having a semantic slot label, the overall parse being constrained based on the semantic schema accessed; and identifying, with the processor, an information extraction frame corresponding to the natural language input based on the frame label and filling in slots in the frame with the one or more constituents labeled by the slot labels.

2. The method of claim 1 wherein identifying comprises:
generating a probability that generated overall parses occur given a word sequence;
selecting an overall parse generated during parsing that has a highest probability of occurring; and
retaining only the semantic information in the overall parse having the highest probability.

3. The method of claim 1 wherein identifying comprises:
generating a probability that generated overall parses occur given a word sequence;
summing the probability over all parses having a common semantic parse; and
selecting the semantic parse based on the summed probability.

4. An information extraction system for extracting information from a natural language speech input using a computer, comprising:
a speech recognizer, including a structured language model, receiving the natural language speech input and generating a textual representation of the natural language speech input based on language modeling by the structured language model, the structured language model accessing a semantic schema having a template with a structure of frames that corresponds to one or more pieces of information to be extracted for an application program and parsing the textual representation, generating a plurality of parse hypotheses, to obtain one or more candidate semantic parse trees, each of the parse hypotheses being constrained during generation, by the template in the semantic schema so that all parse hypotheses that do not match the complete structure of frames in the template are discarded during their construction so that each candidate semantic parse tree obtained by the structured language model matches the structure of frames and all parse hypotheses which do not match the complete structure of frames in the template are rejected, wherein each candidate semantic parse tree has a structure with a semantic frame label and one or more semantic slot labels corresponding to constituents of the textual representation, the semantic frame and slot labels identifying the information to be extracted, and wherein a selected candidate parse includes head words and semantic labels that are used to predict a next word in the natural language input, to obtain an overall parse for the natural language input; and
a processor, being a functional element of the computer, activated by the speech recognizer to facilitate parsing of the textual representation.

5. The system of claim 4 and further comprising:
a ranking component ranking the candidate semantic parse trees generated by the structured language model.

6. The system of claim 5 wherein the ranking component ranks each candidate semantic parse tree by summing over all generated candidate semantic parse trees.

* * * * *